(12) United States Patent
Kanel et al.

(10) Patent No.: US 8,827,247 B2
(45) Date of Patent: Sep. 9, 2014

(54) COMBINATION WARM AND COOL MIST HUMIDIFIER

(75) Inventors: Christopher S. Kanel, Hudson, NY (US); Richard Katzman, New York, NY (US); Bill Fiebel, Succasunna, NJ (US)

(73) Assignee: Helen of Troy Limited, St. Michael (BB)

( * ) Notice: Subject to any disclaimer, the term of this patent is extended or adjusted under 35 U.S.C. 154(b) by 249 days.

(21) Appl. No.: 12/936,483

(22) PCT Filed: Jul. 28, 2010

(86) PCT No.: PCT/US2010/043500
§ 371 (c)(1),
(2), (4) Date: Jan. 24, 2011

(87) PCT Pub. No.: WO2011/014540
PCT Pub. Date: Feb. 3, 2011

(65) Prior Publication Data
US 2012/0112371 A1    May 10, 2012

Related U.S. Application Data

(60) Provisional application No. 61/229,133, filed on Jul. 28, 2009.

(51) Int. Cl.
*B01F 3/04* (2006.01)

(52) U.S. Cl.
USPC .............................. 261/29; 261/72.1; 261/81

(58) Field of Classification Search
CPC ......... F24F 6/02; F24F 6/12; F24F 2006/003; F24F 2006/008; F24F 2006/12
USPC ...................... 261/28, 29, 72.1, 81
See application file for complete search history.

(56) References Cited

U.S. PATENT DOCUMENTS 3,802,161 A * 4/1974 Talbert ............................ 96/257
3,807,145 A * 4/1974 Engalitcheff et al. ........... 96/357

(Continued)

FOREIGN PATENT DOCUMENTS

| CN | 2202877 | 7/1995 |
| CN | 1294281 | 5/2001 |

(Continued)

OTHER PUBLICATIONS

Office Action from corresponding Chinese Patent Application No. 201080042972.7, mailed on Feb. 20, 2014.

*Primary Examiner* — Charles Bushey
(74) *Attorney, Agent, or Firm* — Stroock & Stroock & Lavan LLP

(57) ABSTRACT

A humidifier includes a housing with a substantially open top portion. Water can be added to the humidifier by pouring the water into a water reservoir through an open top. The water is pumped from the water reservoir to an upper portion of the humidifier where it is dispersed into the environment by a flow of air. The humidifier may include both an ultrasonic nebulizer and a heater to provide a warm mix of cool mist and hot vapor. Alternatively, a warm mist can be provided by dispersed water from an ultrasonic nebulizer in combination with warm air. The humidifier may also solely provide a cool mist from an ultrasonic element, or the water can be dispersed using a wicking filter.

11 Claims, 11 Drawing Sheets

(56) References Cited

U.S. PATENT DOCUMENTS

| | | | |
|---|---|---|---|
| 3,817,499 A * | 6/1974 | Lerou | 261/29 |
| 4,009,229 A * | 2/1977 | Szucs et al. | 261/72.1 |
| 4,217,315 A * | 8/1980 | Keeler, II | 261/120 |
| 4,350,646 A | 9/1982 | Baus | |
| 4,351,781 A * | 9/1982 | Blatter | 261/29 |
| 4,630,475 A | 12/1986 | Mizoguchi | |
| 4,822,533 A | 4/1989 | Steiner et al. | |
| 4,853,123 A | 8/1989 | Hayes et al. | |
| 5,226,935 A * | 7/1993 | Wolff et al. | 96/262 |
| 6,244,576 B1 | 6/2001 | Tsai | |
| 6,527,257 B1 * | 3/2003 | Schuld | 261/29 |
| 6,845,971 B2 | 1/2005 | Bachert | |
| 7,073,781 B2 * | 7/2006 | Mulvaney | 261/37 |
| 7,513,126 B2 * | 4/2009 | Boland | 62/310 |
| 2003/0169588 A1 * | 9/2003 | Kohn et al. | 362/101 |
| 2004/0050759 A1 | 3/2004 | Ogawa | |
| 2007/0035044 A1 * | 2/2007 | Chiu | 261/81 |

FOREIGN PATENT DOCUMENTS

| | | |
|---|---|---|
| CN | 2685611 | 3/2005 |
| CN | 201170645 | 12/2008 |
| DE | 20210006 U1 | 3/2003 |
| GB | 689780 A | 4/1953 |

* cited by examiner

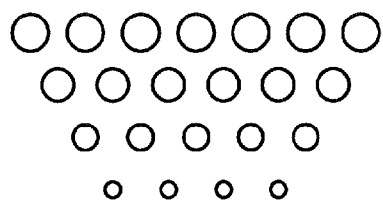
FIG. 10
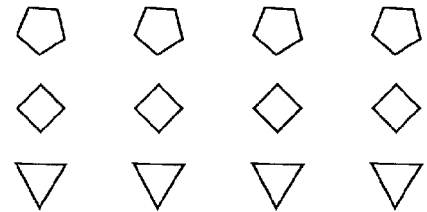
FIG. 11
FIG. 12
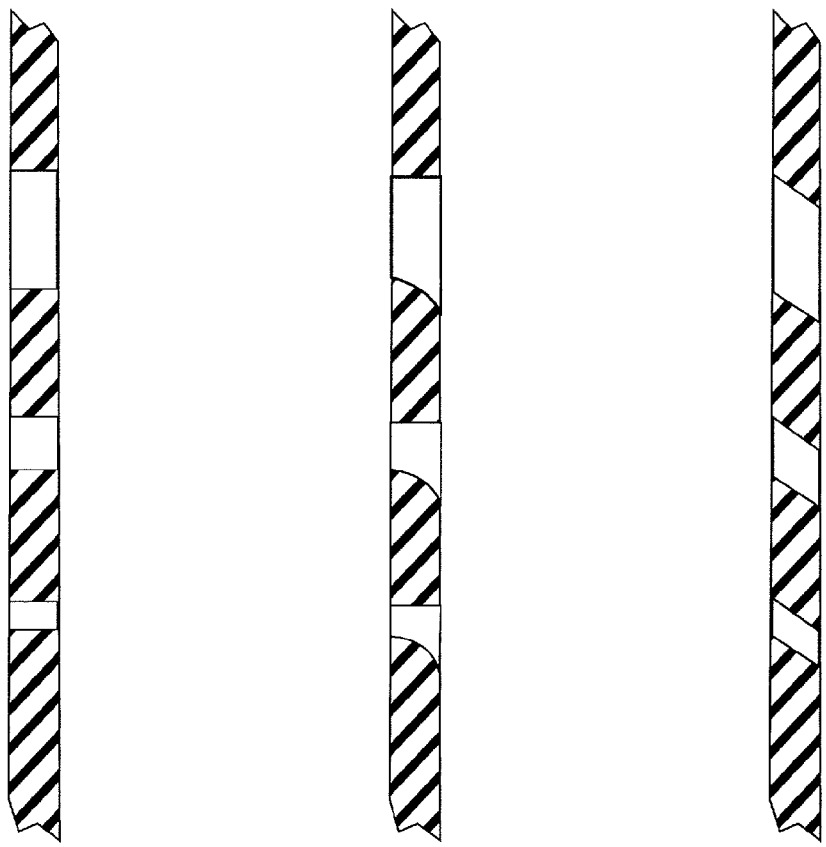

COMBINATION WARM AND COOL MIST HUMIDIFIER

CROSS REFERENCE TO RELATED APPLICATION

This application claims priority to U.S. Provisional Patent Application Ser. No. 61/229,133, filed Jul. 28, 2009, which is incorporated by reference herein.

FIELD OF THE INVENTION

The present invention relates generally to humidifying devices, and more specifically to humidifying devices with an open top through which a tank may be filled with water.

BACKGROUND OF THE INVENTION

Portable humidifying devices, or humidifiers, are used to moisturize the ambient air in a room, most commonly, a single room of a home. Different types of humidifiers are available in both the warm and cool mist varieties. Evaporative humidifiers, or wick humidifiers, utilize a reservoir of water, from which the wick draws moisture, and a fan which forces air through and/or past the wick, thereby picking up moisture as the air is directed through a spout or vent into the room. Ultrasonic humidifiers utilize nebulizers or ultrasonic transducers, a metal diaphragm vibrating at ultrasonic frequency, to cause a fog or mist fanned of small water droplets to rise from the surface of a reservoir containing the transducer and out of a directed opening into the room. Similarly, impeller humidifiers break water into small droplets through a rotating disc that directs the water through a diffuser. Because evaporative, ultrasonic and impeller humidifiers do not heat the water, they are commonly referred to as cool mist humidifiers.

Vaporizers or steam humidifiers boil water and release the steam through a spout or vent into the room. However, due to the high temperatures of the steam (>100° C.), it is usually cooled somewhat before being released into the room. Typically, this is done by mixing it with cooling air from a fan to create a warm mist that is safe to users. The cooling air is usually mixed with the steam in a pathway leading to the directed opening into the room to ensure that it is sufficiently mixed and contains no "hot spots." The smaller the opening into the room, the more it is mixed and the safer the resultant warm mist. Such so-called "warm mist" humidifiers do not produce a true mist because the steam is mixed with cooling air that is not humidified, reducing both output and efficiency. To increase output, the steam is superheated, thus further increasing the risk of getting burned.

However, humidifiers having a combination of warm and cool mist do not typically boil the water. Rather, these combination humidifiers merely heat the water, usually in a connecting tube extending to the nebulizer.

Warm mist humidifiers, though typically consuming more power, also purify the mist through boiling to kill bacteria in the water, while cool mist humidifiers must be cleaned regularly to prevent the accumulation of bacteria and contamination of the air caused by the projection of said bacteria with the mist. Regardless of type, most humidifiers utilize a removable and fillable water tank and a housing with a directed opening, or output vent, which serves to mix and concentrate the mist into the room such that it is projected with sufficient velocity for the droplets to spread apart and humidify a larger volume of the air in the room, not just the air near the humidifier.

SUMMARY OF THE INVENTION

Creating a "true warm mist" through the combination of cool mist and steam, or warm mist, increases efficiency and output since the steam is not mixed only with relatively dry cooling air, but also with cool mist created by an ultrasonic transducer. The mist should sufficiently mix to achieve a substantially uniform, safe temperature. While forcing the mist through a small directed opening or vent is an effective mixing mechanism, spreading the mist through a large open top portion of the humidifier while maintaining a high output is more aesthetic (creating a spa look and feel) and distributes the mist evenly into a larger area of the room. Because nebulized mist does not rise as steam does, a mixing plenum in combination with air flow facilitates a fuller mixing, and therefore a more "true warm mist," before rising through the open top portion. Moreover, because constantly removing and replacing a water tank for refilling can become rather arduous, a humidifier which is fillable by merely pouring water into an open top portion makes the humidifier more convenient to use.

In an embodiment, the present invention provides a combination and cool mist humidifier having a housing with a substantially open top portion. The housing has an inner wall and an outer wall and an air gap between the inner and outer walls. Each of the inner and outer walls includes at least one vent. A main water reservoir within the housing is fillable by providing water to the substantially open top portion. A level engine deck is disposed above a bottom of the main water reservoir and an impeller is configured to pump water from the main water reservoir to an overflow chamber of the engine deck. The engine deck includes a heating reservoir having at least one heating element disposed therein and a nebulizing chamber having at least one ultrasonic transducer disposed therein. An engine chamber is disposed adjacent the water reservoir and below the engine deck and includes at least one motor for driving the impeller and a fan disposed adjacent the at least one vent of the outer wall of the housing so as to draw air into the air gap and through the at least one vent of the inner wall of the housing.

BRIEF DESCRIPTION OF THE DRAWINGS

The foregoing and other features of the present invention will be more readily apparent from the following detailed description and drawings of illustrative embodiments of the invention in which:

FIGS. 10-12 illustrate various weep hole configurations in accordance with an embodiment of the invention;

Like reference numerals are used in the drawing Figures to connote like components of the humidifier.

Figure 1:
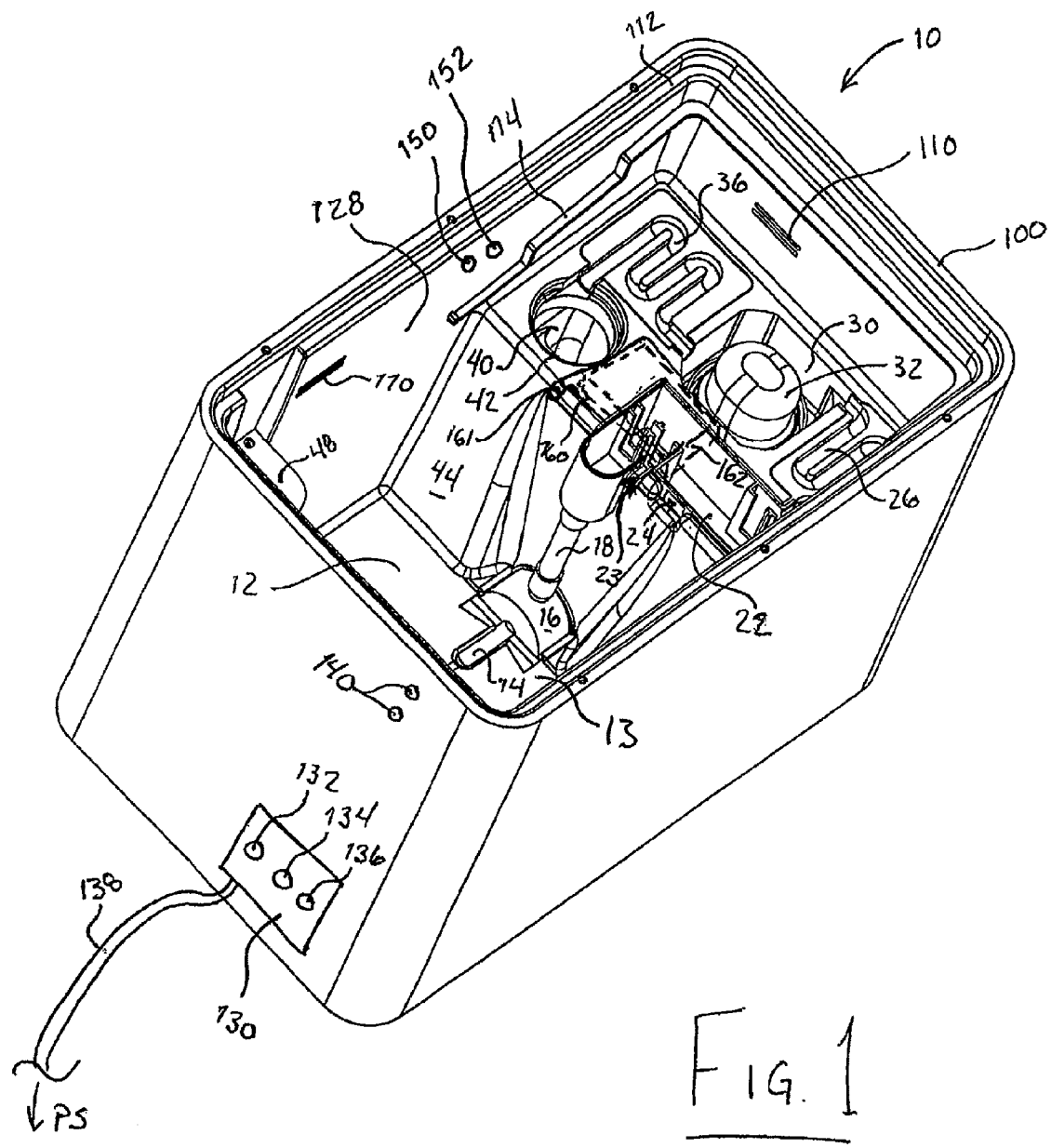
FIG. 1 is a perspective view of a humidifier in accordance with an embodiment of the present invention showing the components of the engine deck.
Figure 2:
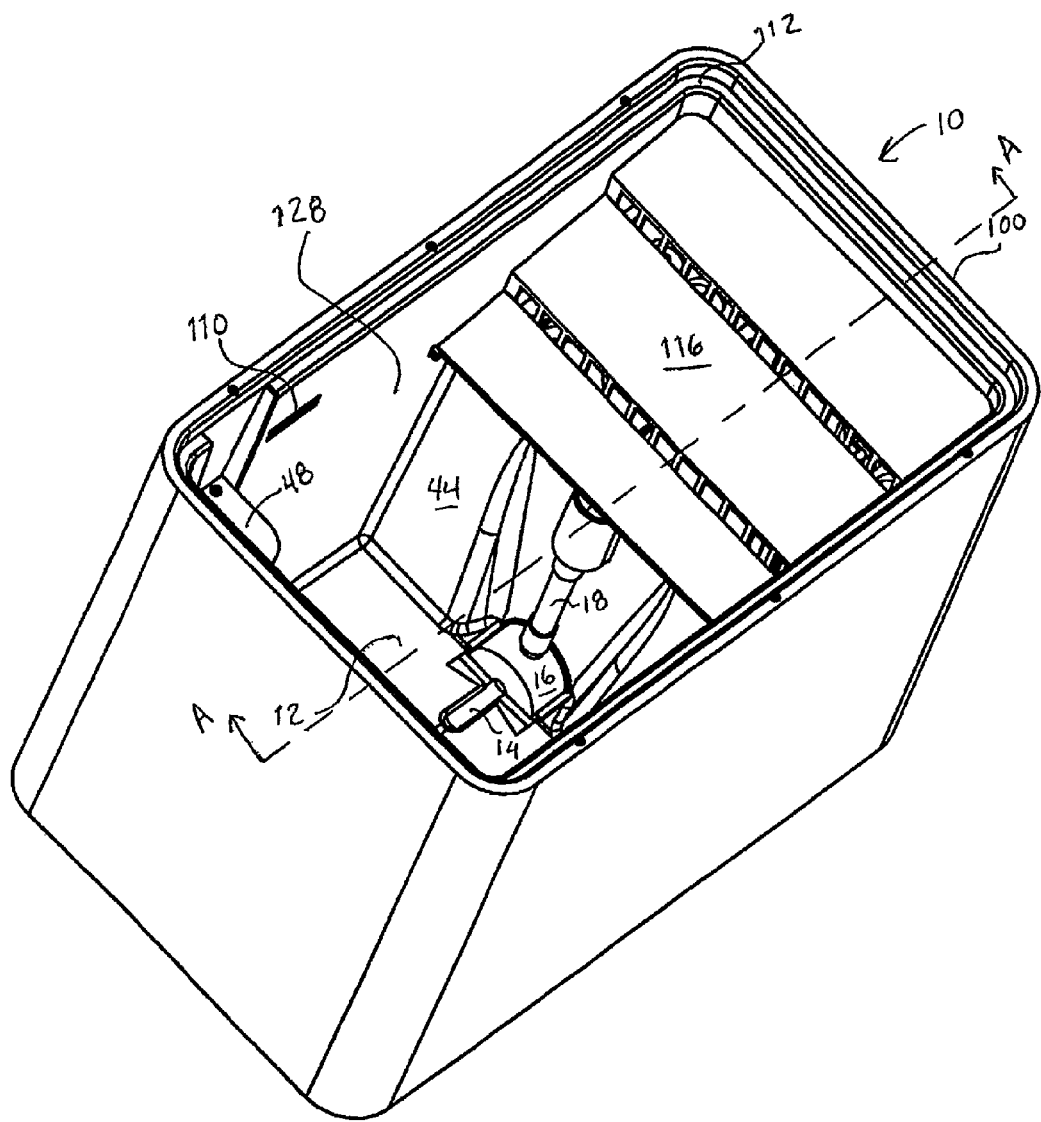
FIG. 2 is a perspective view of a humidifier in accordance with the embodiment of FIG. 1 showing a shield over the engine deck.
Figure 3:
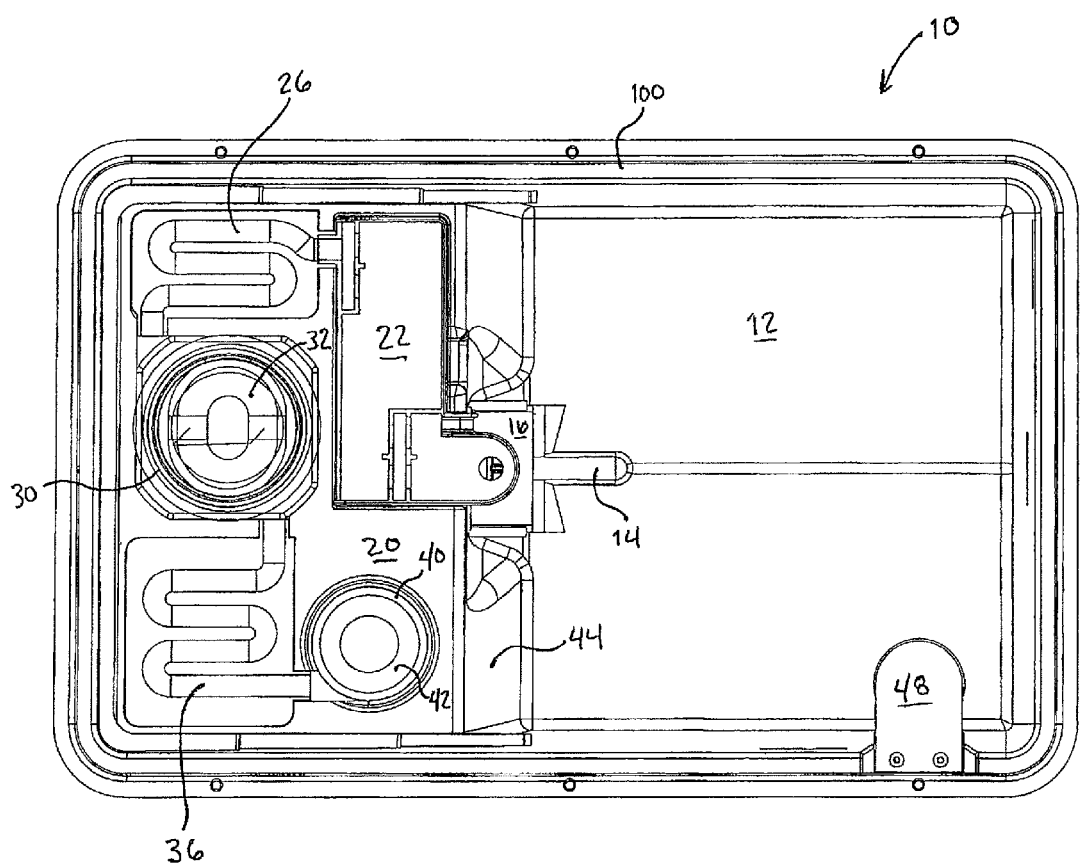
FIG. 3 is a top view of the interior of a humidifier in accordance with the embodiment of FIG. 1.
Figure 4:
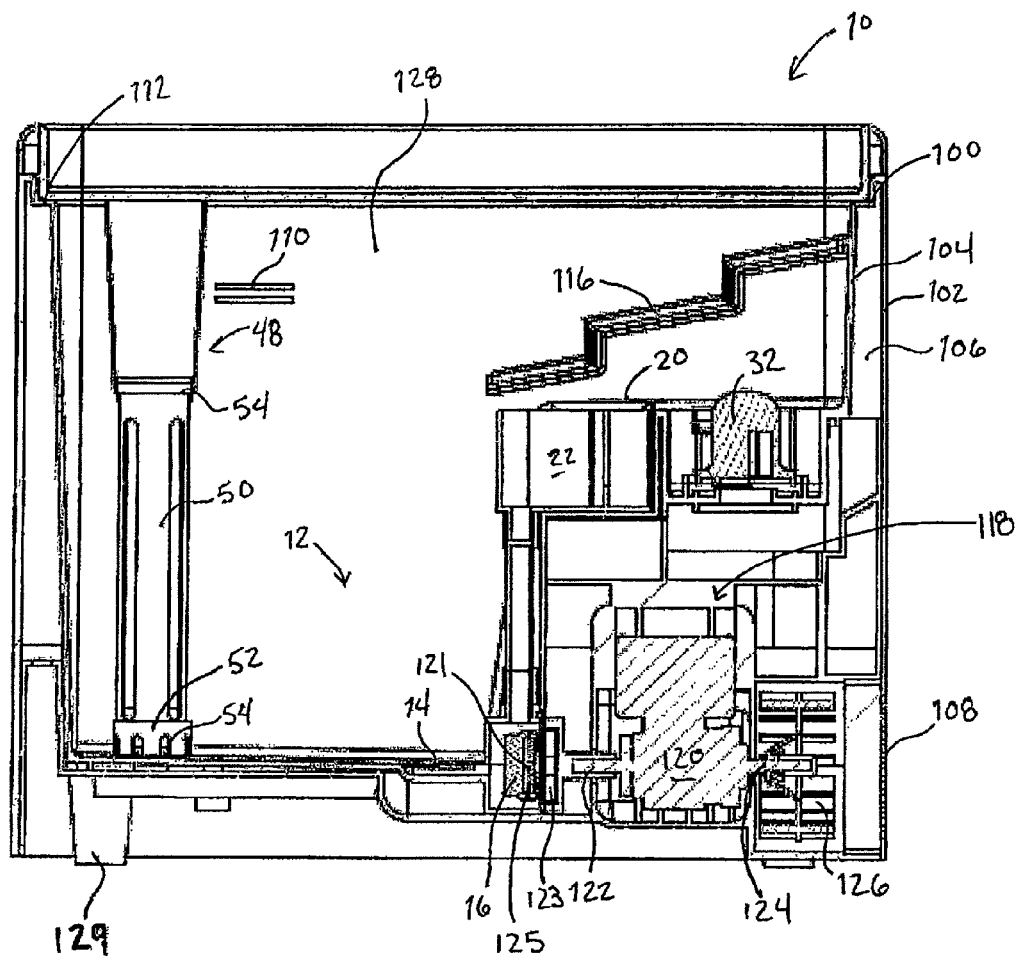
FIG. 4 is a sectional view of the humidifier of FIG. 2 taken along line A-A.

Detailed Description Of The Preferred Embodiments:

Referring to FIG. 1, a humidifier 10 in accordance with an embodiment of the invention has a substantially rectangular housing 100 with a substantially open top portion 128. The main water reservoir 12 of the humidifier 10 is disposed within the housing 100 below the open top portion such that the water reservoir 12 is open to the atmosphere at the top. Accordingly, the humidifier 10 may be top-filled to provide water to the main water reservoir 12. A groove 14 in the bottom 13 of the water reservoir 12 provides water to an impeller 16 which draws the water up through a tube 18 to an overflow chamber 22 of a substantially level engine deck 20 (FIGS. 3 and 4). The overflow chamber 22 maintains the level of water at the engine deck 20 by allowing excess water to flow back into the water reservoir 12 via an overflow opening 24. Additionally, the overflow chamber 22 may also demineralize the water for a cleaner operation, for example, by providing a filter or a chemical for demineralization in the overflow chamber 22. From the overflow chamber 22, the water flows through a first path 26 to a heating reservoir 30 where a heating element 32 boils the water contained therein. From the heating reservoir 30, the water then flows to a nebulizing chamber 40 via a second path 36. The nebulizing chamber 40 includes an ultrasonic transducer 42 for providing a cool mist. An additional path extending from the nebulizing chamber 40 to the main water reservoir 12 may also be provided as a return path. In an alternative embodiment, the water may flow from the overflow chamber 22 to each of the heating reservoir 30 and nebulizing chamber 40 directly. In such an embodiment, the flow can be controlled such that water flowing back into the water reservoir 12 is not heated.

Referring to FIGS. 1-4, the engine deck 20 is provided above and adjacent to the main water reservoir 12 with a sidewall 44 extending upward from the bottom of the main water reservoir 12 to the engine deck 20. The sidewall 44 also serves to insulate an engine chamber 118 contained within the housing 100 adjacent the main water reservoir 12 and below the engine deck 20. The sidewall 44 may be inclined toward main water reservoir 12 to help direct any overflow water and may also include a recessed portion for the impeller 16. This inclined sidewall 44 can reduce or eliminate sounds generated by splashing and dripping as the water returns to the water reservoir 12. Preferably, the housing 100 includes at least an outer wall 102 and an inner wall 104 with an air gap 106 defined therebetween. The inner wall 104 is attached or integral to the engine deck 20 such that the engine chamber 118 has pathways to the air gap 106. The engine chamber 118 is sealed within the housing 100 from the main water reservoir 12 and the engine deck 20 so as to prevent water from entering into the engine chamber 118. Preferably, the air gap 106 is provided along all four sides of the housing 100. In one embodiment, the air gap 106 is also provided in the base section of the housing 100 extending below the main water reservoir 12.

At least one motor 120 is provided in the engine chamber 118. The motor 120 preferably utilizes a magnetic drive with first and second output shafts 122, 124 at opposite sides thereof. In this manner, the impeller 16 can be attached to the first output shaft 122 and a fan 126 can be attached to the second shaft 124 so as to drive both the impeller 16 and the fan 126 by the same motor 120. Preferably, the first output shaft 122 runs to drive a first magnet 123 disposed within the engine chamber 118. The first magnet 123 is coupled to drive a second magnet 125 disposed on the other side of sidewall 44. The second magnet 125 is connected to the impeller 16 so as to drive it. The magnetic coupling of the first and second magnets 123, 125 also serves to maintain the impeller 16 on a bearing 121 which prevents the impeller 16 from becoming unstable and causing noise when the main water reservoir 12 reaches a low fill level. The magnetic coupling also ensures that no opening to the engine chamber 118 is created through which a leak could form. Such an arrangement saves space, increases efficiency and decreases manufacturing costs since only one motor 120 is required. However, it is also possible for the fan 126 and the impeller 16 to be separately driven. The fan 126 also serves to cool the engine chamber 118, including motor 120 so that it operates more efficiently and does not overheat.

The fan 126 is arranged adjacent the outer wall 102 of the housing 100 in a region containing intake vents 108. The intake vents 108 may be provided with a filter to purify the air as it enters the housing 100. The motor 120 drives the fan 126 in order to pressurize the engine chamber 118 and force air into the air gap 106. The air travels between the outer and inner walls 102, 104 of the housing 100 (i.e., through air gap 106) and exits into the interior of the humidifier 10 through one or more output vents 110 disposed in the inner wall 104. Preferably, output vents 110 are provided in the inner wall 104 on each side of the housing 100 at the open top portion 128, or between the engine deck 20 and the open top portion 128, in order to mix and evenly distribute the warm mist rising from the heating reservoir 30 and cool mist rising from the nebulizing chamber 40. The airflow provided by the output vents 110 also serves to pressurize the interior of the humidifier 10 so that the combined mist rises substantially uniformly from the open top portion 128. In this manner, a substantially uniform output of mist at a substantially uniform temperature is provided throughout the open top portion 128 of the humidifier 10. Preferably, the temperature of the air and combined mist exiting through the open top portion 128 is in the range of 110° F. to 130° F. (43.3° C. to 54.4° C.).

The engine deck 20 is covered by a shield 116 to prevent water from falling onto the engine deck when the humidifier 10 is top filled by a user. Preferably, the shield 116 is inclined downward from the inner wall 104 at the rear of the housing 100 toward the main water reservoir 12. The shield 116 may be a single sloped surface or a series of sloped steps and extends at least slightly beyond the sidewall 44. The shield 116 may be attached to the housing 100, but is more preferably removably arranged on supports 114 to allow access to the engine deck. In the embodiment shown in FIGS. 1-4, the shield 116 includes sloped steps with air gaps between the steps to allow the mist to pass therethrough. For this reason, output vents 110 are provided behind the steps between the engine deck 20 and the shield 116. The humidifier 10 can be top filled with water anywhere through the open top portion 128 and the shield 116 directs the water away from the engine deck 20 and into the main water reservoir 12. Accordingly, the humidifier 10 is easy to fill without affecting its operation as a substantially even level of water at the engine deck is maintained. In conjunction with the airflow from the output vents 110, the shield 116 also helps to direct condensation forming on the bottom thereof away from the engine deck 20. In addition, the bottom of the shield 116 may also include ribs to direct water and prevent condensation from falling into the heating reservoir 30 or the nebulizing chamber 40.

The main water reservoir 12 includes a shut-off device 48 which may be, for example, a hollow tube 50 having a floating foam donut 52 disposed thereabout. The hollow tube 50 includes a thin metal magnetic reed switch 54 disposed at a predetermined minimum fill level at or near the bottom of the main water reservoir 12. As water in the main water reservoir 12 is used up, the donut 52, which also contains a magnet, floats downwards with the level of water toward the reed switch 54. Upon reaching the reed switch 54, the magnet in the donut 52 shuts off the reed switch 54 which is connected to the power supply of the humidifier 10 to prevent the heating element 32 from burning out. In addition to cutting off power to the humidifier 10, the reed switch may also be used to cause an indicator light 140 on the housing 100 to be lit and to indicate that the unit is out of water. Further, additional reed switches 54 may also be provided at predetermined heights in the hollow tube 50 to indicate one or more fill levels. As the main water reservoir 12 is filled, the donut 52 will float upwards toward a reed switch 54 and, upon reaching one of the predetermined heights, will turn on the reed switch 54 which is connected to an indicator light 140 on the housing 100 to indicate to a user that a fill level (for example, a maximum fill level) has been achieved so that the humidifier 10 is not overfilled. Alternatively, a low voltage system with small electrodes may be substituted for the reed switches 54. In such an embodiment, a circuit can be completed by water contacting the electrodes thereby causing the indicator light 140 to indicate to the user that a desired fill level has been achieved. As another alternative, or in addition, the humidifier may include a float switch to shut off the humidifier when it is empty.

Alternatively or in addition, one or more shut-off devices could be provided on the engine deck 20. Accordingly, such a shut off device could directly measure the amount of water being received by either or both of the heating element 32 or ultrasonic element 42. Thus, the vaporizing engines could be shut off if they are not receiving water, regardless of the amount of water in the tank (for example, if there were a problem with the impeller 16).

Other fill level indicators, such as a viewing window in the housing 100 with graduations, may also or alternatively be provided to indicate the overall level of water in the main water reservoir 12. Likewise, at least a portion of the walls of the housing 100 could be transparent and could be provided with cascading water falling to the level of water in the main water reservoir 12 so as to create a water wall effect.

The housing 100 may be any of a number of shapes, such as square, circular or oval and may be formed from one or more of plastic or metal. The base of the housing 100 may be provided with feet 129, which may also be adjustable in height, to keep the humidifier 10 stable and level. Additionally, a decorative wall or covering with various patterns and colors may be provided around the outside of the housing 100. Further, the housing 100 may include lighting, for example, light-emitting diodes (LEDs) within the humidifier 10 or about the open top portion 128 to accent or "light up" the rising mist in various colors. Where LEDs are provided, it is possible to also shunt the air provided across the nebulizing chamber 40 so as to create a swirling glow effect.

While it is preferable to arrange the main water reservoir 12 on one side of the housing 100 and the engine chamber 118 on the other in order to efficiently make use of the internal space of the humidifier 10, other conFigurations are also possible. For example, the engine chamber 118, with the engine deck 20 disposed thereabove, could be sealingly, centrally disposed in the housing 100, with the main water reservoir 12 surrounding the engine deck 118. To draw air into the housing 100, a drive shaft could be attached the first output shaft 122 extending through or beneath the main water reservoir 12 to a fan 126 disposed in a widened region of the air gap 106 adjacent intake vents 108.

The impeller 16 may be continuously or periodically operated to provide water to the engine deck 20 through tube 18. Preferably, the impeller 16 and the fan 126 are both continuously run by the motor 120. Additionally, by providing a continuous supply of water at higher volumes to the overflow chamber 22, a waterfall effect through the overflow opening 24 and/or overflow spout 23 can be achieved. The overflow chamber 22 preferably demineralizes the water, for example, by providing one or more filters disposed between ribs at an inlet and/or an outlet of the overflow chamber 22.

Because the engine deck 20 is substantially horizontally level and the overflow chamber 22, the heating reservoir 30, the nebulizing chamber 40 and the first and second paths 26, 36 are formed as recesses therein, the water is provided at substantially the same level to the foregoing components of the engine deck 20 to facilitate a level, controlled rate of flow. Instead of recesses, the first and second paths 26, 36 may alternatively be tubes or other types of passages. From the overflow chamber 22, the water flows through the first path 26 to the heating reservoir 30. The heating reservoir 30 includes at least one heating element 32, for example, a centrally disposed, traditional resistance heating element, which boils the water in the heating reservoir 30. The first path 26 is preferably a tortuous or serpentine path so as to tune the flow of water to the heating reservoir 30. Similarly, the second path 36 extending from the heating reservoir 30 to the nebulizing chamber 40 is also preferably a tortuous or serpentine path to control the flow rate and to cool the water before it reaches the nebulizing chamber 40. Due to a relatively small cross sectional area of the first and second paths 26, 36 relative to the heating reservoir 30 and the controlled flow of the water provided by the tortuous or serpentine path, the convective losses from the heating reservoir 30 are reduced, and thus, boiling efficiency is increased. In conjunction with the tuned flow of water from the first path 26, the heating reservoir 30 is able to consistently produce a high output of steam. A high output of humidifying mist is produced by the humidifier 10 when the high output of steam is mixed with the cool mist emitted from the nebulizing chamber 40 by the at least one ultrasonic transducer 42 vibrating therein at ultrasonic frequencies. The arrangement of the heating reservoir 30 and the nebulizing chamber 40 on the engine deck 20 (as illustrated, for example in FIG. 1) could be switched, so that the water reaches the nebulizing chamber 40 before it reaches the heating reservoir 30. When cooler water is provided to a nebulizer the mist can have the tendency to condense onto a cool floor. Moreover, because the water is purified by boiling in the heating reservoir 30 (killing approximately 96% of the bacteria) both the warm and cool mist are purified and the bacteria is prevented from becoming suspended in the ambient air. Nevertheless, it is possible to provide water to the nebulizing chamber 40 directly from the overflow chamber 22, in particular in a cool mist embodiment where the heating reservoir 30 is not provided. Likewise, water could also be provided directly to the heating reservoir 30 as well. Alternatively, as described above, two separate paths could extend from the tube 18 along the engine deck 20 to the heating element 32 and ultrasonic element 42. Accordingly, the warm mist from the heating element 32 and cool mist from the nebulizer 42 would mix before exiting the humidifier 10.

The humidifier 10 may also utilize ultraviolet disinfection to make the water germ-free. One way to accomplish this would be to provide an ultraviolet lamp adjacent to the first path 26. Other methods of providing ultraviolet disinfection are described in the commonly owned U.S. Pat. No. 7,513, 486, the entire contents of which is incorporated herein by reference.

In one embodiment, the heating element 32, the ultrasonic transducer 42 and the motor 120 are connected to the same standard power supply, but have separate controls for each on a controller 130 connected to a power supply PS, for example, a battery or a standard AC source through a standard power cord 138. For example, a transducer control 132, a heating element control 134 and a fan speed control 136 may be provided to separately control the ultrasonic transducer 42, the heating element 32 and the fan 126, respectively. In this way, it is possible for the user to get only cool mist from the nebulizing chamber 40 or to get only warm mist from the heating reservoir 30. Additionally, the temperature of the combined mist may be adjusted by varying the power levels provided to the heating element 32, the ultrasonic transducer 42, and/or the fan 126. Further, a temperature sensor 150 may be provided and coupled with the controller 130 to automatically provide the proper power levels at all times. A humidity sensor 152 may be provided near or at the open top portion 128 and/or outside the housing 100 to sense the level of humidity and send a signal to the controller 130 to throttle back the power levels when it nears a predetermined humidity level. In this way, it is possible to avoid the non-uniform on/off cycling of typical humidifying devices. The controller 130 may be a proportional-integral-derivative (PID) controller communicating with the humidity sensor 152 and/or temperature sensor 150 and using control loop feedback that throttles back power to substantially maintain a predetermined humidity level and/or temperature.

In other embodiments, different models or conFigurations of the humidifier 10 are provided. For example, the engine deck 20 may contain either the heating reservoir 30 only or the nebulizing chamber 40 only to provide warm mist or ultrasonic/cool mist models, respectively. In these cases, the overflow chamber 22 would extend via a first path 26 to either the heating reservoir 30 or the nebulizing chamber 40, depending on the model, and a second path could lead back to the main water reservoir 12. The humidifier 10, including the combined mist, the warm mist and ultrasonic/cool mist models, may also be provided with an evaporative wicking filter and/or as an evaporative model.

To provide such an evaporative model, a wicking filter 162 (shown for exemplary purposes in FIG. 1 with dashed lines) having a supporting grill 160 is provided on the engine deck 20 over the overflow chamber 22, or a separate reservoir, to draw water therefrom. The wicking filter 162 is typically formed from slit and expanded paper provided in multiple layers. Air is then forced orthogonally through or past the wicking filter 162 from the pressurized engine chamber 118 through output vents 110 provided in the engine deck 20 below the wicking filter 162 and/or on the inner wall 104 of the housing 100. Alternatively, the airflow may be reversed such that it is drawn into the humidifier through the wicking filter 162. Preferably, the wicking filter is arranged horizontally or at an incline relative to the engine deck 20 so as to maximize its surface area facing the substantially open top portion 128. In this arrangement, the wicking filter 162 pulls water in horizontally through its layers from the overflow chamber 22 and/or one or more additional chambers. A gutter 161 may be provided around the periphery of the wicking filter 162 to direct water dripping therefrom back to the main water reservoir 12, and the wicking filter 162 may be inclined toward the gutter 161. Providing moisture to at least a portion of the cooling air through the wicking filter 162 further provides the advantage of increased humidity levels which can be attained. In addition, a purely evaporative model of the humidifier 10 could be provided by leaving out the heating chamber 30, the nebulizing chamber 40 and first and second paths 26, 36 or by shutting them down via the heating element control 134 and the transducer control 132.

Figure 5:
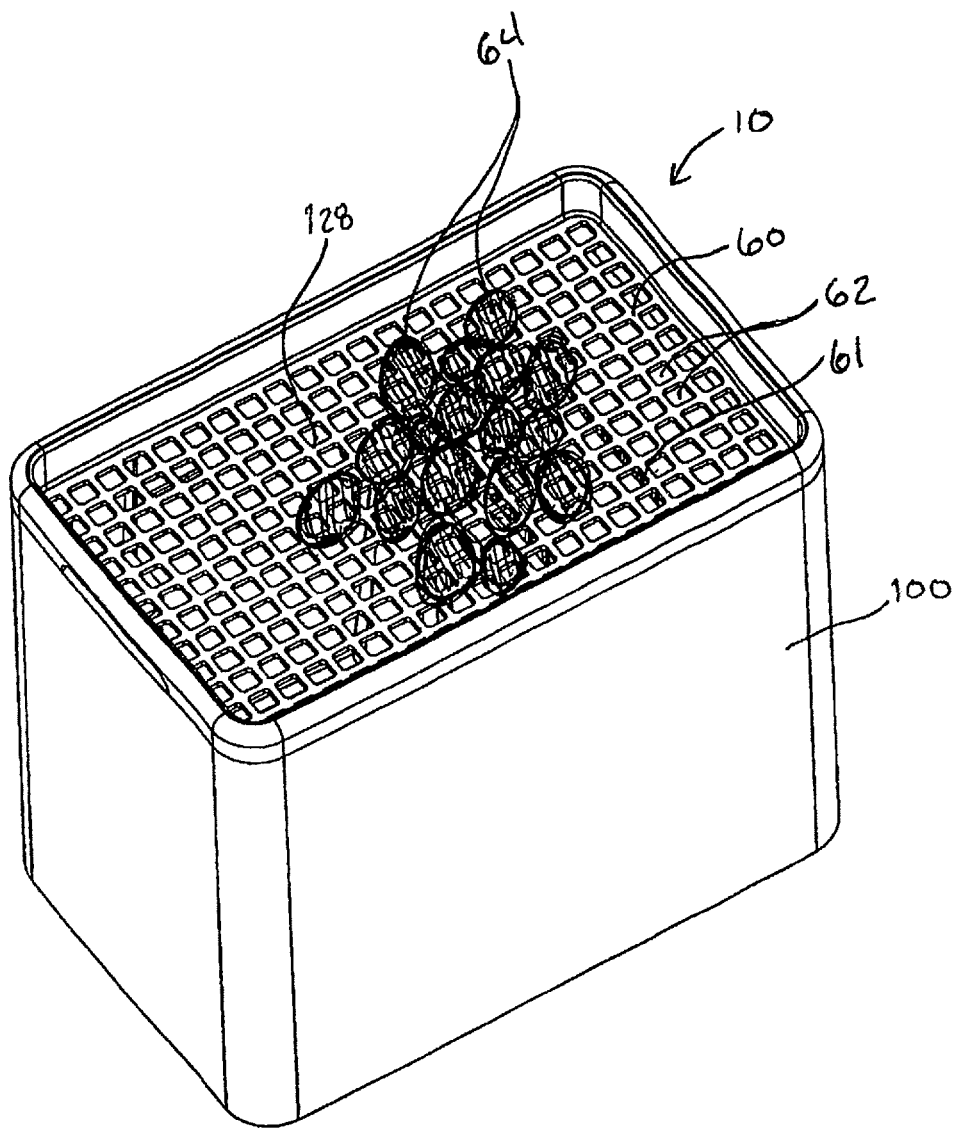
FIG. 5 is a perspective view of a humidifier in accordance with an embodiment of the present invention including a baffled cover.

Referring to FIG. 5, a cover 60 which may also serve as a mixing plenum 61 is provided at the open top portion 128 of the humidifier 10. The cover 60 is preferably removable and supported by a ledge 112 at or near the top of the housing 100 (as shown, for example in FIG. 1). The cover 60 includes a plurality of openings or baffles 62 throughout, for example, in a grid pattern. The baffles 62 may be of various size and shape, such as rectangular or circular. The baffles 62 and the cover 60 facilitate a more uniform flow of mist through the open top portion 128 by further spreading and mixing the warm and cool mist and providing directed openings for the combined mist. The cover 60 may also include spouts and/or paths which may be, e.g., aqueduct paths for retaining water on the surface thereof. Preferably, a mixing plenum 61, which may have a similar conFiguration to the cover 60, or could consist of other shapes, such as tapered, and may include a plurality of spouts and/or tortuous paths, is also provided below the cover 60 for further mixing the cool mist and steam prior to it rising out from the top of the humidifier 10. Additionally, the cover 60 provides a support surface for various additional features for aesthetics and/or increased functionality. For example, a bed of smoothed stones 64, or polished pebbles, may be provided on the cover 60. In addition to making the humidifier more aesthetically pleasing by giving a natural spa-like look and feel, the smoothed stones 64 also serve multiple functions. First, the stones 64 help to further mix and distribute the warm mist as it travels through the stones 64 and out of the top of the humidifier 10. Second, the stones 64 are warmed and wetted as mist rises therethrough (and also wetted when the humidifier 10 is top filled by the user), thereby providing additional heat and moisture to the rising mist through convection and evaporation. Additionally, the stones 64 may be provided with an aromatic oil to provide a pleasing and fragrance to the room. Further, a medicated inhalant may also be provided at the cover 60 for therapeutic purposes. The open top portion 128 and the even distribution of mist at a substantially uniform and safe temperature makes it easy for a user to utilize the humidifier 10 for therapeutic purposes since it creates a larger area for the user to breathe in the medicated inhalant without fear of being burned. Similarly, wood chips, pellets or blocks could also be provided on the cover 60 serving like functions to the stones 64.

Figure 6:
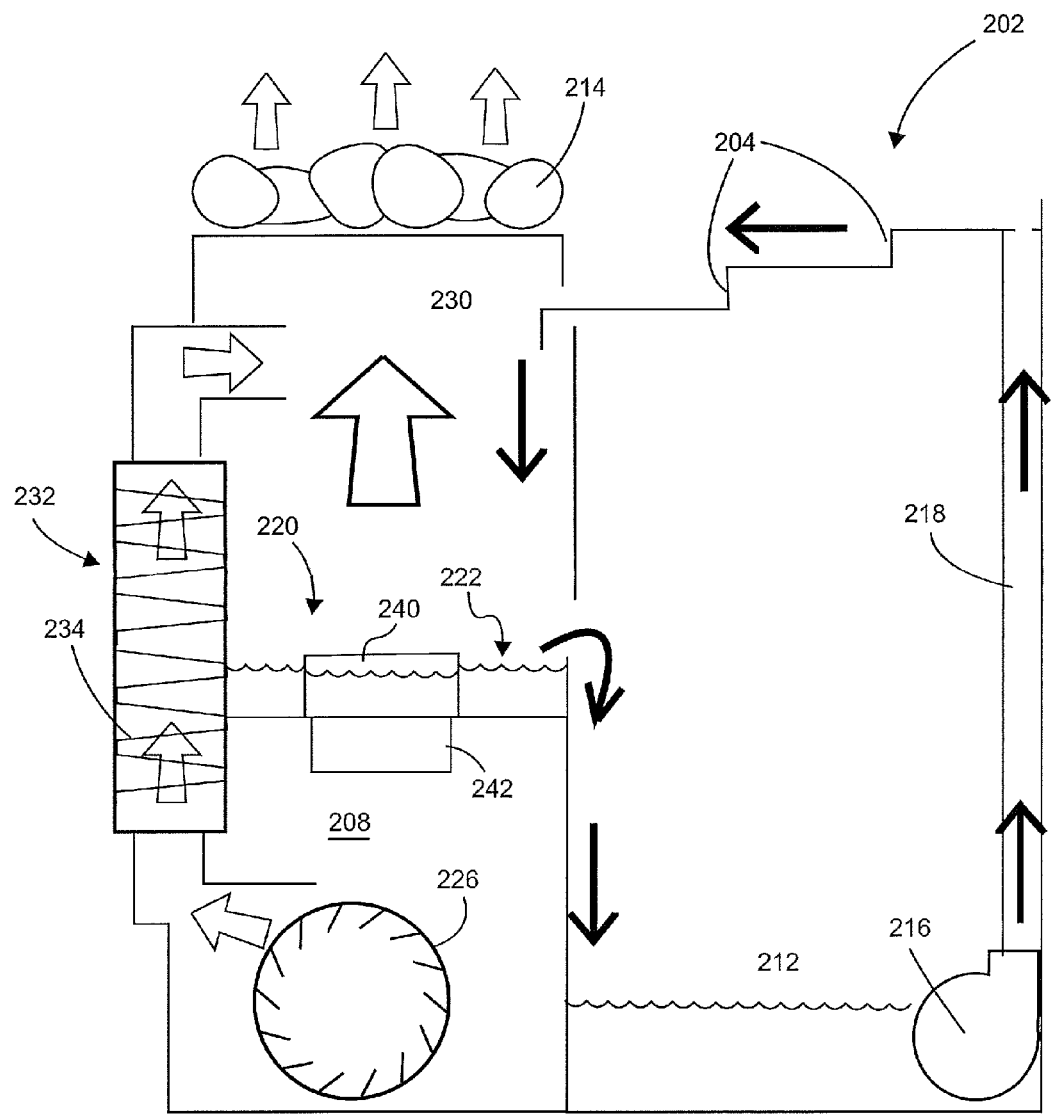
FIG. 6 is a schematic representation of another embodiment of a humidifier.

FIG. 6 shows a schematic illustration of another embodiment of a humidifier 200 in accordance. Humidifier 200 illustrates additional features of a humidifier that may be implemented in accordance with the invention. These features can be combined with any of the features described above with respect to humidifier 10. Humidifier 200 includes a water feature 202, in the form of a shallow waterfall. The water feature 202 is an attractive addition of the humidifier 200 and functionally delivers water pumped from the main water reservoir 212 to the engine deck 220. The water feature 202 may include one or more steps 204 that the water cascades over as it flows down the water feature. The water is pumped up to the water feature 202 from the main water reservoir 212 with an impeller 216. The impeller 216 is driven by a motor and may be connected thereto magnetically as discussed above with respect to humidifier 10. Although the impeller 216 and fan 226 are shown at opposite sides of humidifier 200, these elements may be conFigured more closely so that they can be driven by a single motor, as discussed above. In operation, the water is driven up to the water feature 202 through a tube 218, as shown by the solid arrows in FIG. 6. The water then flows down the water feature 202 until it falls into an overflow chamber 222 on the engine deck 220. The engine deck 220 is equipped with a nebulizing chamber 240, which receives water from the overflow chamber 222. An ultrasonic transducer 242 disperses water from the nebulizing chamber 240 into the air above engine deck 220 forming a cool mist. Excess water that is not immediately converted into a mist falls from the overflow chamber 222 back into the main water reservoir 212.

Use of the impeller 216 to cycle water over the water feature 202 and onto the engine deck 220 where it contacts the ultrasonic transducer 242 allows the main water reservoir 212 to be open to atmospheric pressure. In contrast, the water in most humidifier tanks is held in the tank by a vacuum. This open type of system also allows the amount of water held in the nebulizing chamber 240 to be controlled very precisely by using the overflow chamber 222 to distribute excess water back to the main water reservoir 212 so that the ultrasonic transducer 242 always has an appropriate amount of water.

The cool mist formed by the ultrasonic transducer 242 is mixed with air in a mixing chamber 230 above the engine deck 220. The air is delivered to the mixing chamber 230 from a duct 232 as the result of a fan 226 disposed in an engine chamber 208 below the engine deck 220. The fan 226 pressurizes the air in the mixing chamber 230, causing it to flow up and out of the humidifier 200 through a cover and stones 214.

The humidifier 200 may be operated in the above-described manner to produce humidification in the form of a cool mist. Alternatively, a heating element 234 may be included in the duct 232 to warm the air before it is mixed with the mist. As a result, the heated air heats the dispersed water producing a warm mist. The warm mist then rises through the cover 206 and stones 214 creating a spa effect. In the illustrated embodiment, the heating element is formed as a wire heater that is wound helically within the duct between the fan 226 mixing chamber 230. Alternatively, the wire heater could be wrapped around the duct 232. Other embodiments of the heating element are also possible. For example, the heating element 234 may be a PTC element. The heating element 234 could also be coupled to a heat exchanger to increase the efficiency of the delivery of heat to the air. Forming a warm mist by heating the air and mixing the heated air with the cool mist provides certain advantages over the inclusion of a water heater in the humidifier. First, energy from the water heater can transfer to water outside of the heater chamber. Thus, with a water heater, the water in the overflow chamber 222 may be warmed. As a result, this warm water can overflow into the main water reservoir 212. Thus, over time, all of the water in the system can be warmed, which may be seen as disadvantageous by a user. Moreover, many ultrasonic transducers perform more efficiently with room-temperature water. Thus, heated water will negatively affect the efficiency of the humidifier.

Figure 7:
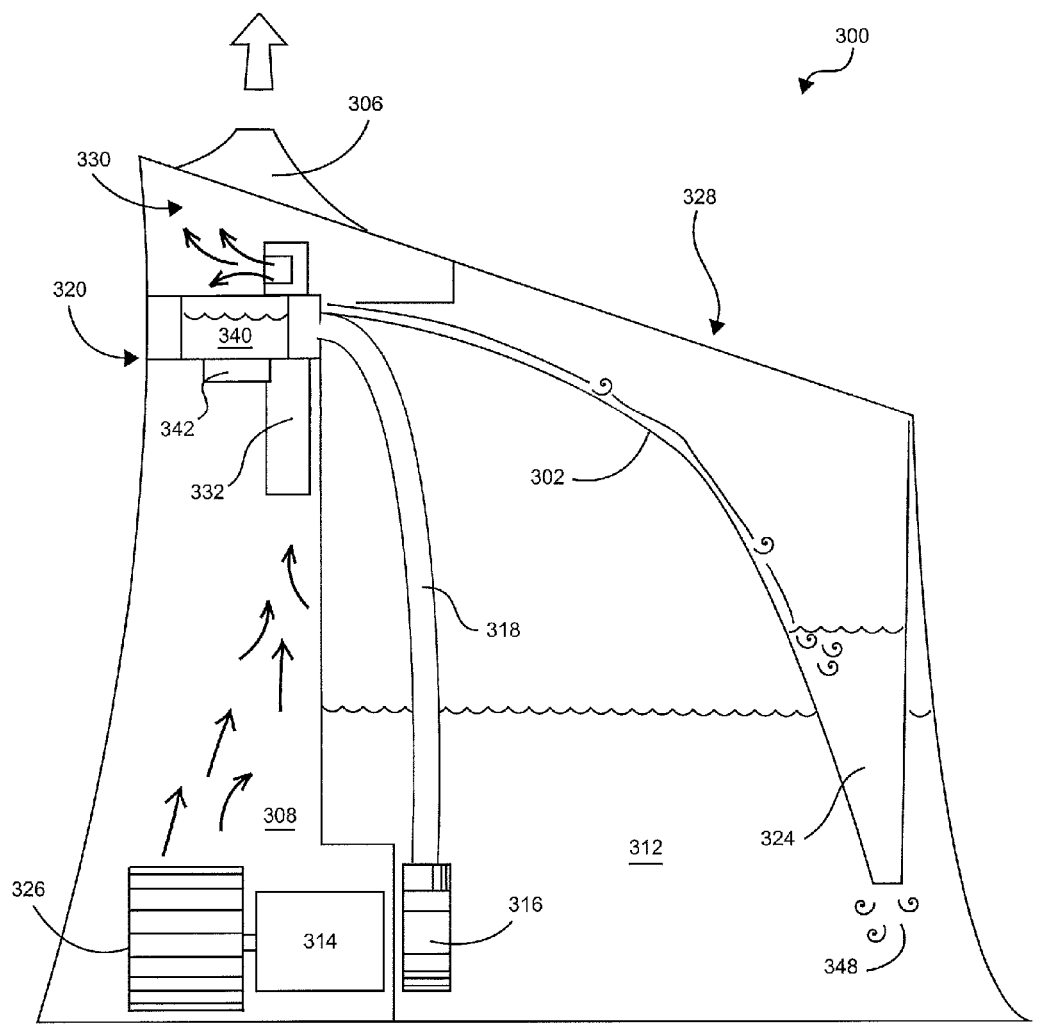
FIG. 7 is a cross-sectional side view of another embodiment of a humidifier.
Figure 8:
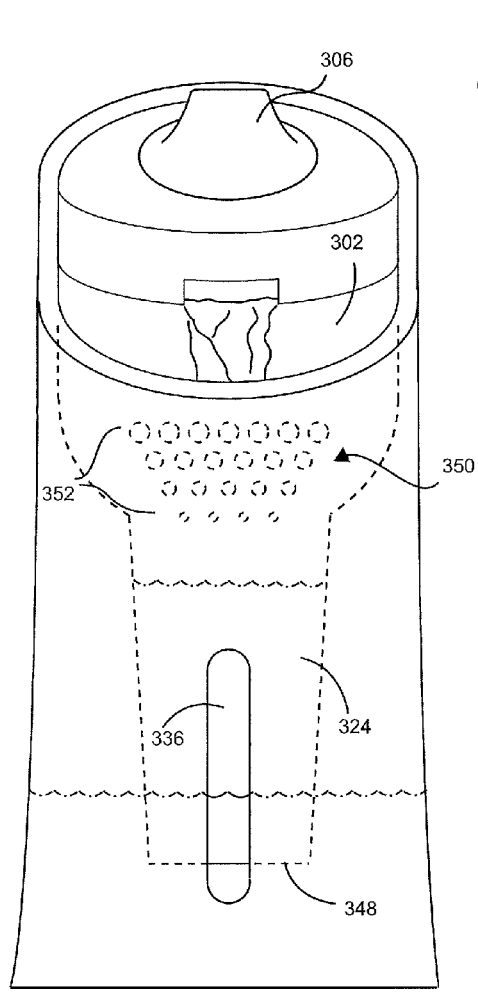
FIG. 8 is a front view of the humidifier of FIG. 7
Figure 9:
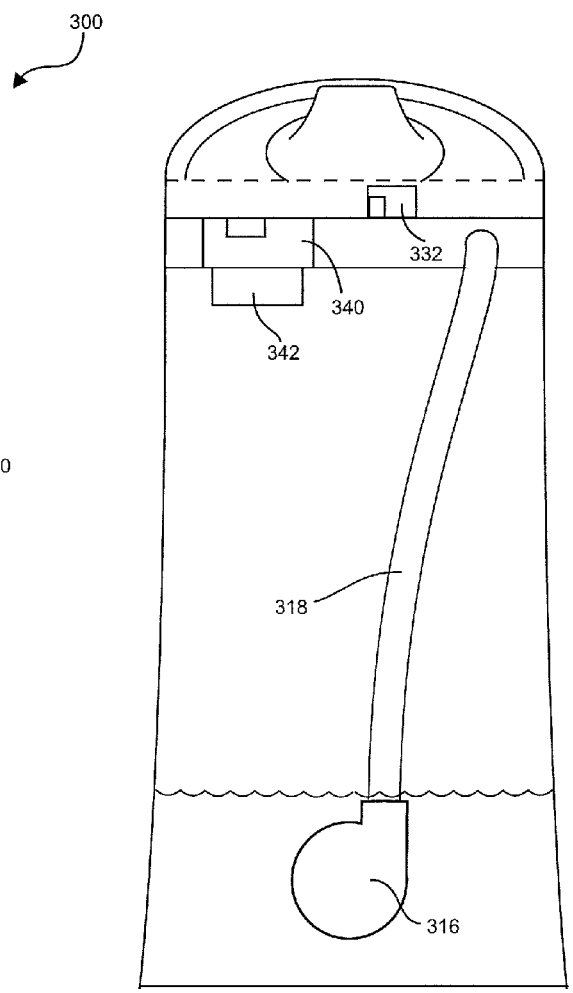
FIG. 9 is a cross-sectional front view of the humidifier of FIG. 7.

FIGS. 7-9 show another embodiment of a humidifier 300 in accordance with the invention. Humidifier 300 illustrates additional features of the invention, which may be combined with any of the features of humidifiers 10 or 200. Similar to humidifiers 10 and 200, humidifier 300 includes an open top 328 which allows the main water reservoir 312 to be filled by pouring water into the humidifier 300 from the top, for example, using a pitcher. From the main water reservoir 312, the water is pumped up through a tube 318 to an overflow reservoir including a nebulizing chamber 340 on the engine deck 320. The water is pumped to the engine deck 320 using an impeller 316, which is driven by a motor 314.

The engine deck 320 includes a nebulizing chamber 340 in fluid communication with an ultrasonic transducer 342. The transducer 342 disperses water from the nebulizing chamber 340 into a cool mist in a mixing chamber 330. The mist is then mixed with pressurized air that is driven into the mixing chamber 330 by a fan 326. In the illustrated embodiment, the fan is housed in an engine chamber 308 disposed below the engine deck 320. The fan 326 is driven by a motor which may be the same motor 314 as that which drives the impeller 316. Alternatively, a separate motor may be used to drive the fan 326. The fan 326 pressurizes air within the engine chamber 308 which drives the air through a duct 332 into the mixing chamber 330 where it mixes with the mist. As an alternative, air may flow from the engine chamber 308 to the mixing chamber 330 through a port connecting the two chambers. The mist is propelled into the atmosphere by the pressurized air within the mixing chamber 330 through a nozzle 306. In an embodiment, the nozzle may be rotatable, such that the mist can be directed in a direction as desired by the user.

Excess water pumped to the engine deck 320 overflows from the overflow chamber 340 down a water feature 302 back into the main water reservoir 312. The water feature 302 of humidifier 300 is conFigured as a curved slope that flows down to the main water reservoir 312. The slope 302 curves downward, such that the gradient is shallow at the top and steep at the bottom. The bottom of the slope 302 flows into a funnel 324 that delivers the water back to the main water reservoir 312. The combination of the slope 302 and the funnel 324 allows the water overflowing from the engine deck 320 to first flow smoothly into a pool formed in the funnel 324 and then be poured into the main water reservoir 312. The bottom of the funnel 324 has a constricted outlet 348, which controls the flow rate to the main reservoir 312. Accordingly, a pool of water is formed in the bottom of the funnel 324. The curved slope 302 of the water feature allows the water to flow into the pool in the funnel 324 quietly. This prevents a loud splashing sound that would otherwise occur if the water flowed directly into the water reservoir 312 from the overflow chamber 322. The bottom of the funnel 324 may be positioned low enough that constricted outlet 348 is submersed in the water within the reservoir 312, or it may be close enough to a surface that a splashing sound is avoided. The constricted outlet 348 may be achieved by a narrow tapering toward the bottom of the funnel 324 or with one or more small openings at the bottom of the funnel.

To prevent the funnel 324 from overflowing, it may include weep holes 350 along a sidewall thereof. The weep holes 350 allow water to drain out of the funnel 324 when the water flow is greater than the amount that can flow through the constricted entrance. Moreover, the weep holes 350 can control the position of the top of the pool within the funnel 324 over a range of different water flow rates. Within a range of flow rates, the water level within the funnel 324 will build until water is flowing out of the weep holes 350. Accordingly, the weep holes 350 can be positioned at a height that is optimal for reducing splashing noises of the water flowing down the curved slope 302.

To add further control to the water level in the funnel 324, a plurality of rows 352 of weep holes may be included in the funnel at different heights. In the illustrated embodiment, the weep holes increase in size from the lowest row to the highest row, as shown in FIG. 10. This allows greater use of the weep holes 350 for draining water from the funnel 324, as the water flow rate increases more drastically. The top row 352 of weep holes may be large enough that water will flow out of the funnel 324 at even very large flow rates. For example, if a user pours additional water into the humidifier 300 on the curved slope 302. Further, the top row 352 of weep holes may include more holes than the lower rows. For example, in FIG. 10, each row contains one more weep hole than the row below it. In the embodiment shown in FIGS. 8 and 10, the weep holes are all round. Alternatively, the weep holes may be formed in other shapes, such as ovals or polygons, as shown in FIG. 11. Moreover, the holes may all be formed in the same shape, as shown in FIG. 10, or they may have different shapes, as shown in FIG. 11. Furthermore, the holes may be bored through the side wall of the funnel in a variety of manners to vary the ease of manufacturing or the ability of the holes to drain the water quietly down the side wall of the funnel 324 which is slightly inclined toward the water reservoir. For example, FIG. 12 shows weep holes formed in three different manners. The image on the left shows weep holes that are directed straight through side walls, which simplifies manufacturing. The image in the middle of FIG. 12, shows weep holes with a curved lower edge on the outer side of the funnel 324. This would provide exceptionally quiet drainage through the holes. The image on the right shows angled weep holes which may be easy to manufacture and provide quiet drainage.

Humidifier 300 may also include a window 336 on a front surface thereof, as shown in FIG. 8 which allows the user to see the water level of the main water reservoir 312. A light may also be provided in the vicinity of the window 336 to illuminate the water level. In one embodiment, the constricted outlet 348 may be aimed toward the window 336 within the water reservoir 312. As a result, air bubbles that are introduced into the water reservoir with water from the funnel 324 may travel to the window 336 and rise along the window creating a "water wall" visual that is pleasing to the user.

Figure 13:
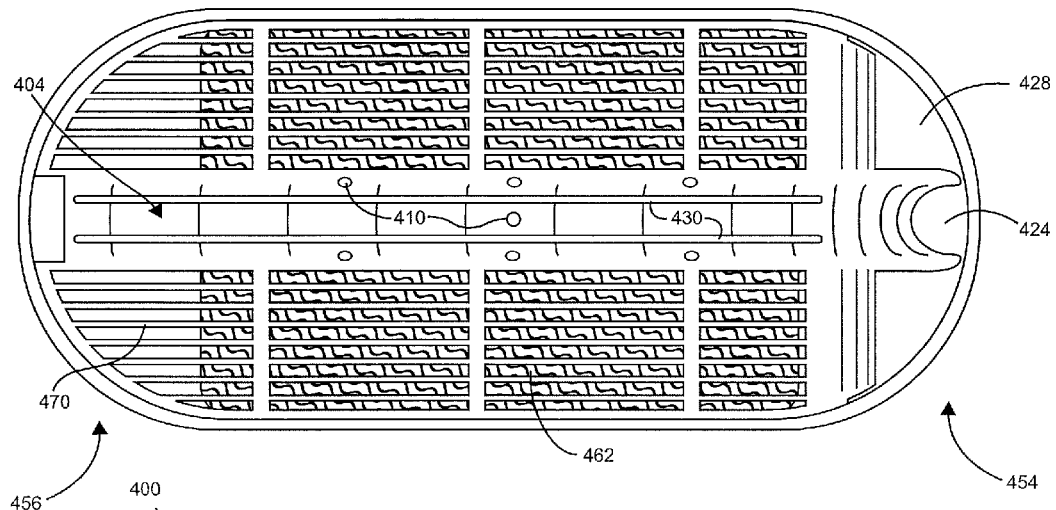
FIG. 13 is a top view of another embodiment of a humidifier.
Figure 14:
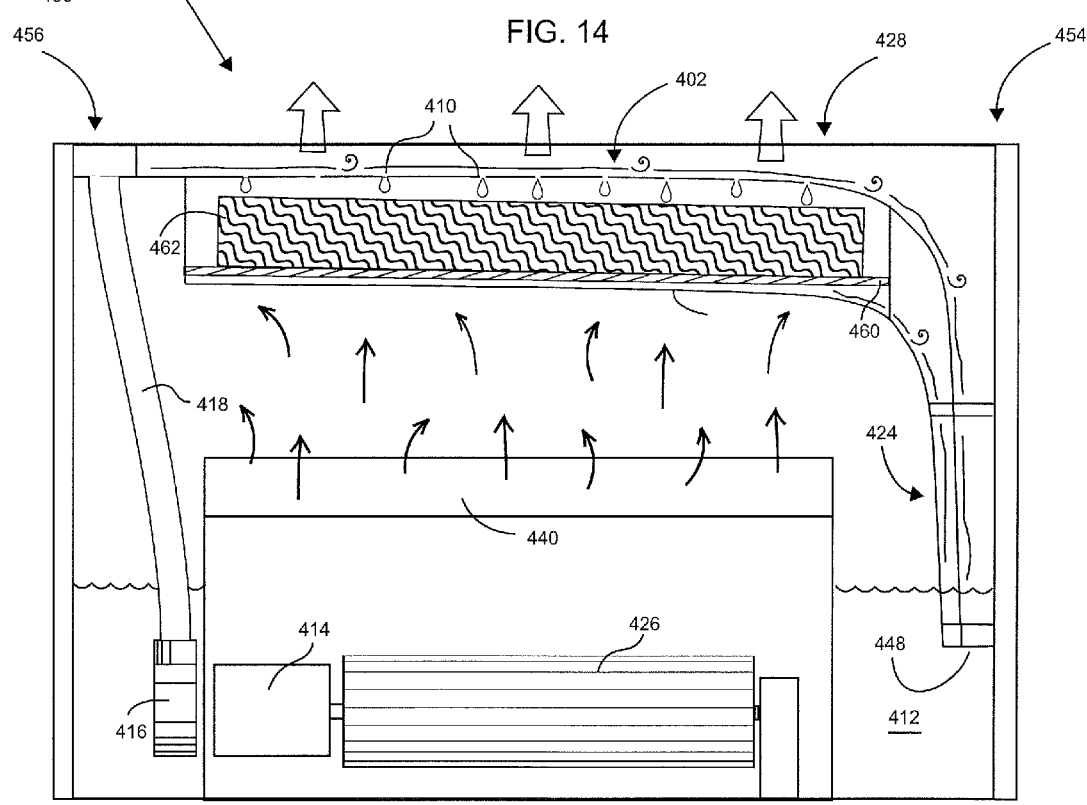
FIG. 14 is a cross-sectional side view of the humidifier of FIG. 13.
Figure 15:
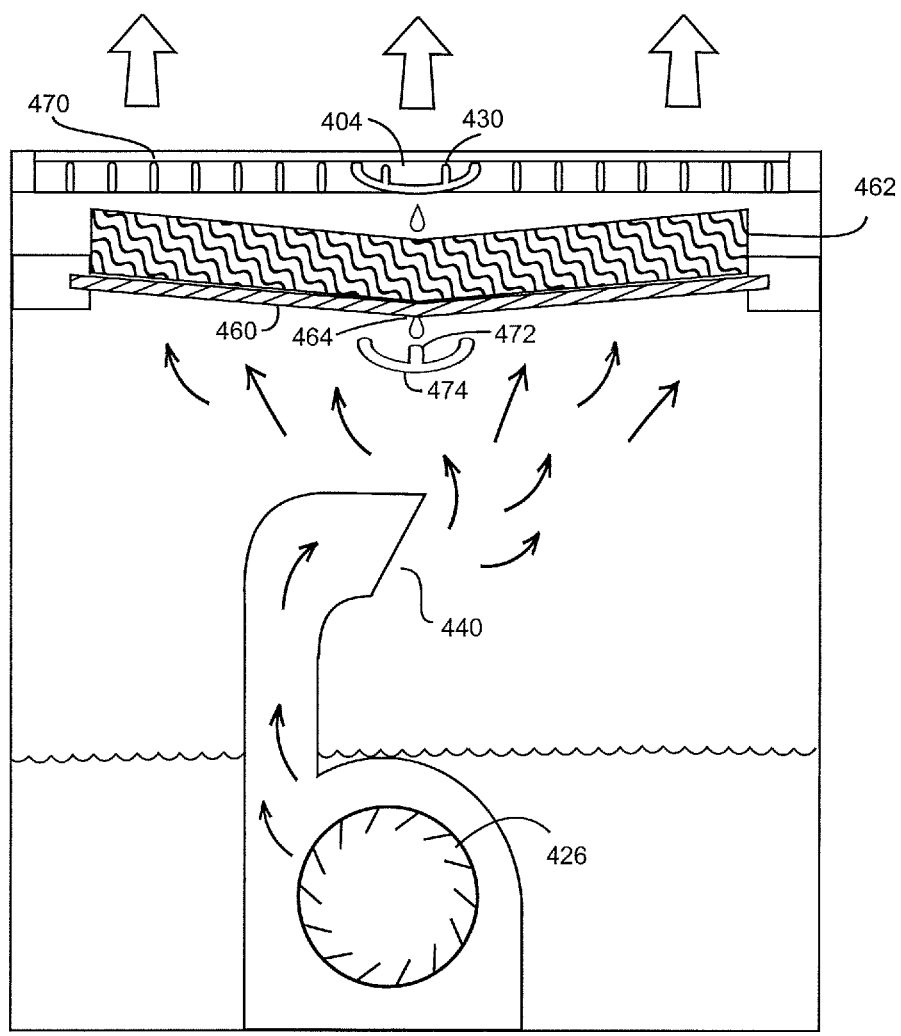
FIG. 15 is a cross-sectional front view of the humidifier of FIG. 13.

FIGS. 13-15 illustrate another humidifier 400 in accordance with the invention. Humidifier 400 illustrates additional features of the invention, which may be combined with any of the features of humidifiers 10, 200 or 300. Humidifier 400 includes a wicking filter 462 that disperses water into the air. A water feature 402 drips water onto the filter 462, which is spread through the body of the filter. Air from a fan 426 is forced up through the filter 426 to distribute the water into the atmosphere around humidifier 400. The filter 462 may be formed from one or more layers of paper or plastic sheet that is slit at regular intervals and expanded to provide a lattice structure with a large surface area. Similar to humidifiers 10, 200 and 300, discussed above, humidifier 400 has an open top 428 so the water reservoir 412 may be filled by pouring water through the open top 428. The top of the humidifier may include a grating 470 to protect the filter 462 from objects falling into the humidifier 400 and to encourage users to refill the main water reservoir 412 from an open front side 454 of the humidifier 400 that includes a funnel 424.

From the water reservoir 412, water is pumped to an upper portion of the humidifier through a tube 418 using an impeller 416. At the top of the humidifier 400, the water is guided to one end of a water feature 402 at a rear side 456 of the humidifier 400. The water flows through a channel 404 across to the front side 454 of the humidifier dripping water through a number of openings 410 in the channel 404 onto the wicking filter 462. At the front side 454 of the humidifier, the water returns to the water reservoir 412 via the funnel 424. Similar to that of humidifier 300, the water feature 402 may lead into the funnel 424 along a curved slope so that a splashing noise is reduced. Moreover, funnel 424 may have a constricted outlet 448 at the bottom to promote the formation of a pool in the funnel, which further silences the movement of the water.

As stated above, the water that is dripped onto the wicking filter 462 is spread throughout the body of the filter which has a large surface area. From the wicking filter 462, the water is dispersed into the atmosphere by pressurized air within the humidifier 400 as a result of the operation of fan 426. The fan 426 is driven by a motor 414, which is housed together with the fan 426 in an engine chamber 408. Air is propelled by the fan 426 into the inside of the humidifier through a vent 440. As pressure inside the humidifier builds, the air is forced up through the wicking filter 462, where it gathers moisture which is then dispersed into the room.

Similar to humidifier 300, humidifier 400 is configured to adapt to varying amounts of water flow. Accordingly, the channel 404 of the water feature 402 includes dividers 430 that form three separate conduits in the channel 404. The inner conduit includes one or more openings 410 along its length to distribute a small amount of water to the wicking filter 462 during low water flow levels. Accordingly, the humidifier 400 is able to run for long periods of time when the water flow is low. If the water flow is increased, the water will flow into the outer conduits, where it can be delivered by additional openings 410 to the wicking filter 462 over a larger area of the filter. To further limit the output of the humidifier during low speed operation, the humidifier 400 may include a louver in the air supply plenum to restrict air flow during low speed operation. In such an embodiment, when the humidifier runs at high speed, the air pressure can force the louver to a fully open position. In contrast, when the humidifier runs at low speed, the louver can be partially closed, thereby restricting air flow.

The wicking filter 462 is substantially planar and sits below the grating 470 underneath the channel 404 of the water feature 402. In operation, the filter 462 is horizontally disposed so that the upward moving air passes through a large cross-section of the filter 462. Water dripping down onto the center of the wicking filter 462 through the openings 410 in the channel 404 is wicked horizontally outward so that all of the air passing through the filter 462 is able to carry water from the humidifier 400. The filter is supported in the humidifier by a mesh support 460 that is configured as a thin sheet, such as a screen. Excess water that is not captured by the air flowing through the wicking filter 462 will settle to the bottom of the filter 462 and drip downward.

To control the dripping of the water from the wicking filter 462, the mesh support 460 is stretched taut in the v-shape with the lowest point 464 in the center. As a result, excess water in the filter will flow to the center and drip in a controlled manner only from the low point 464 of the filter. To utilize this controlled dripping, the humidifier includes a conduit 474 disposed below the wicking filter 462 along the low point 464 of the v-shaped support 460. To promote capturing of the excess water in the conduit 474, the conduit 474 may include a central ridge 472 that extends up toward the support 460. The ridge 472 helps break any surface tension in drops of water hanging down from the filter 462, thereby ensuring that they fall into the conduit. Similar to the channel 404 of the water feature, the conduit 472 may also have a curved slope toward the front side 454 of the humidifier 400 forming a second funnel to quietly lead water into the reservoir. overbearing While the invention has been particularly shown and described with reference to preferred embodiments thereof, it will be understood by those skilled in the art that various changes in foam and details may be made therein without

What is claimed is:

1. A humidifier comprising:
   a housing;
   a main water reservoir within the housing open to atmospheric pressure that is fillable by providing water to an opening in a top portion of the housing;
   a fan configured to generate an air flow through the housing;
   an impeller configured to pump water toward a top of the humidifier;
   a humidification device disposed above the main water reservoir and configured to distribute at least a portion of the pumped water into the air flow;
   a water feature disposed above the main reservoir, the water feature configured to direct at least a portion of the pumped water back to the main water reservoir, the water feature including a downward curved slope and a funnel at a bottom of the slope, wherein the funnel includes a constricted outlet opening at a bottom end thereof such that a pool of overflow water is formed in the funnel, and wherein the funnel includes at least one weep hole disposed above the constricted outlet for allowing excess water to flow from the pool of overflow water; and
   at least one motor for driving the impeller and the fan.

2. The humidifier of claim 1 further comprising a control device operable to adjust the flow rate of the impeller.

3. The humidifier of claim 1, wherein the bottom end of the funnel is adjacent the bottom of the main reservoir.

4. The humidifier of claim 1, wherein the at least one weep hole is disposed opposite the downward curved slope.

5. The humidifier of claim 4, wherein the at least one weep hole includes a plurality of weep holes.

6. The humidifier of claim 5, wherein the plurality of weep holes include weep holes of various sizes of cross section.

7. The humidifier of claim 5, wherein the plurality of weep holes include weep holes of various shapes of cross section.

8. The humidifier of claim 4 wherein the at least one weep hole slopes downward toward an outside of the funnel.

9. The humidifier of claim 1 further comprising an engine deck disposed within the housing above the main water reservoir and configured to hold water in an overflow chamber,
   wherein the impeller pumps water to the overflow chamber, the humidification device is disposed on the engine deck, and the water feature receives water overflowing from the overflow chamber.

10. The humidifier of claim 1, wherein the housing includes a window configured to show the level of water stored in the main water reservoir.

11. The humidifier of claim 10 further comprising a light source configured to illuminate the window.

* * * * *